United States Patent
Loukusa

(10) Patent No.: US 10,435,159 B2
(45) Date of Patent: Oct. 8, 2019

(54) CABIN PRESSURE OUTFLOW VALVE NOISE SUPPRESSION DEVICES AND METHODS

(71) Applicant: The Boeing Company, Chicago, IL (US)

(72) Inventor: Steven M. Loukusa, Bothell, WA (US)

(73) Assignee: The Boeing Company, Chicago, IL (US)

( * ) Notice: Subject to any disclaimer, the term of this patent is extended or adjusted under 35 U.S.C. 154(b) by 1468 days.

(21) Appl. No.: 14/502,638

(22) Filed: Sep. 30, 2014

(65) Prior Publication Data
US 2016/0229540 A1 Aug. 11, 2016

(51) Int. Cl.
| | | |
|---|---|---|
| B64D 13/02 | (2006.01) | |
| F16K 1/20 | (2006.01) | |
| F16K 1/36 | (2006.01) | |
| B60H 1/00 | (2006.01) | |
| B60H 1/24 | (2006.01) | |

(52) U.S. Cl.
CPC ......... B64D 13/02 (2013.01); B60H 1/00564 (2013.01); B60H 1/00871 (2013.01); B60H 1/248 (2013.01); F16K 1/2021 (2013.01); F16K 1/36 (2013.01); B60H 2001/006 (2013.01); Y02T 50/56 (2013.01)

(58) Field of Classification Search
CPC .................................. B64C 21/06; B64C 1/38
USPC ....... 244/117 R, 209, 130; 137/601; 454/105
See application file for complete search history.

(56) References Cited

U.S. PATENT DOCUMENTS

| | | | | | |
|---|---|---|---|---|---|
| 3,426,984 | A | * | 2/1969 | Emmons | B64D 13/02 244/117 R |
| 5,074,376 | A | * | 12/1991 | Powell | B63H 1/28 181/277 |
| 5,598,990 | A | * | 2/1997 | Farokhi | B64C 23/06 244/198 |
| 5,772,155 | A | * | 6/1998 | Nowak | B64C 5/08 244/200.1 |
| 6,116,541 | A | * | 9/2000 | Chuang | B64D 13/02 244/1 N |
| 6,302,360 | B1 | * | 10/2001 | Ng | B64C 23/06 244/130 |
| 6,485,093 | B2 | * | 11/2002 | Reivers | B60J 7/22 296/180.1 |

(Continued)

*Primary Examiner* — Vivek K Shirsat
(74) *Attorney, Agent, or Firm* — Miller, Matthias & Hull LLP

(57) ABSTRACT

A system and method for regulating pressure inside a vehicle ("cabin pressure") with reduced noise is disclosed. The system can include a forward gate and an aft gate that can be moved from a closed position to an open position to release cabin pressure in a controlled manner. The forward gate and the aft gate can comprise one or more flow disruptors. A first portion of the flow disruptors can be fixed and a second portion can be moveable between a retracted position and a deployed in position. In the retracted position the one or more flow disruptors can reduce broadband noise through the system by smoothing air flow therethrough. In the second position, the one or more flow disruptors can create boundary layer turbulence. The boundary layer turbulence can prevent, or delay, flow separation reducing tonal noises therethrough. In this manner, flow efficiency can be increased and noise reduced.

17 Claims, 15 Drawing Sheets

(56) References Cited

U.S. PATENT DOCUMENTS

| | | | | |
|---|---|---|---|---|
| 6,682,413 B1* | 1/2004 | Hoffman | ............... | B60H 1/248 |
| | | | | 454/156 |
| 8,840,451 B2* | 9/2014 | Royalty | ............... | B64D 13/02 |
| | | | | 137/809 |
| 9,429,071 B2* | 8/2016 | Quackenbush | ........... | F02C 7/04 |
| 9,429,400 B1* | 8/2016 | Sowle | .................... | F42B 10/02 |
| 9,464,532 B2* | 10/2016 | Sutton | ...................... | F01D 7/00 |
| 9,546,001 B2* | 1/2017 | Steinert | ................. | B64D 13/02 |
| 2004/0238046 A1* | 12/2004 | Hoffman | ............... | B60H 1/248 |
| | | | | 137/601.08 |
| 2009/0214342 A1* | 8/2009 | Brindejonc | .......... | B64C 27/605 |
| | | | | 416/115 |

\* cited by examiner

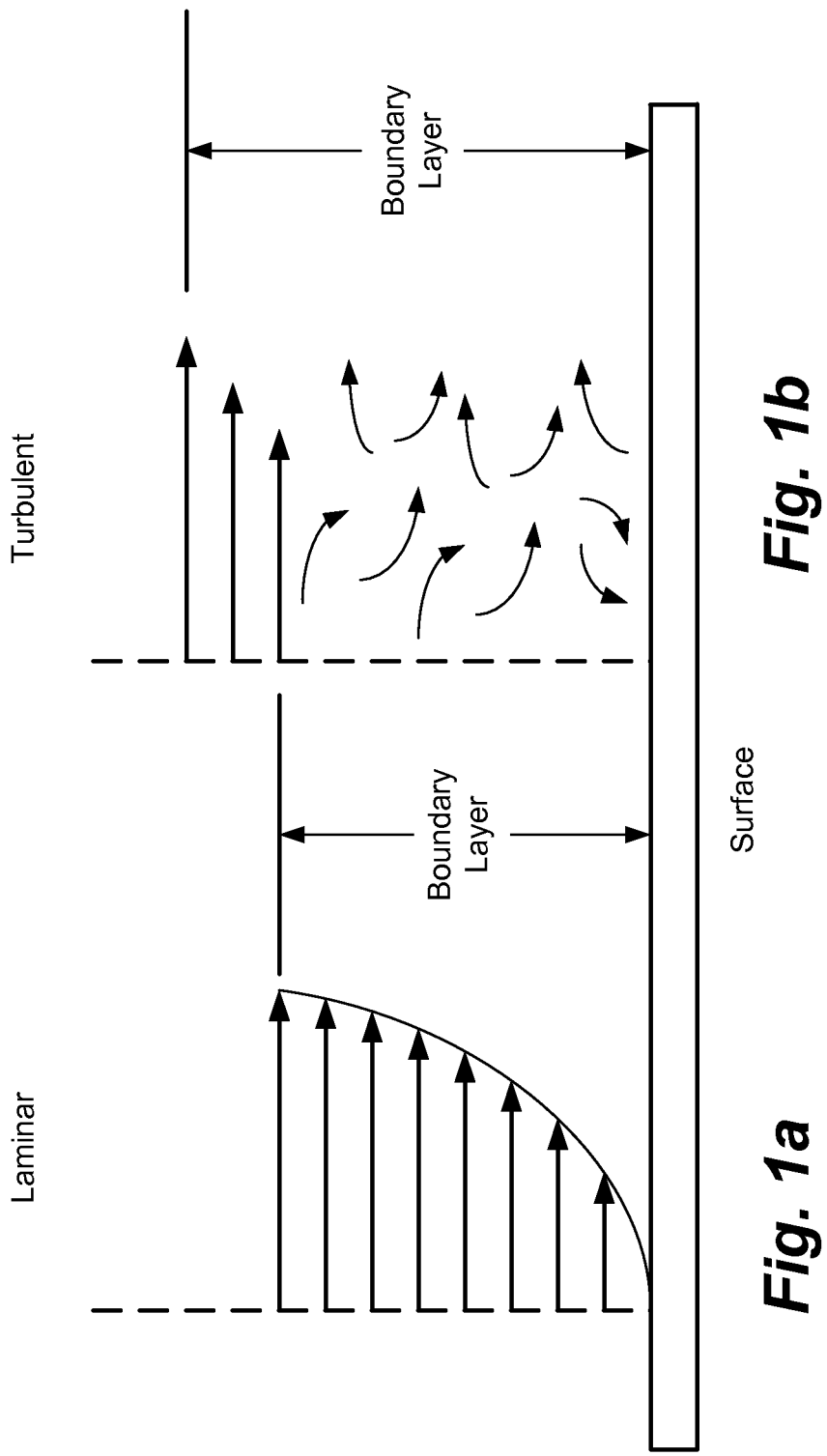

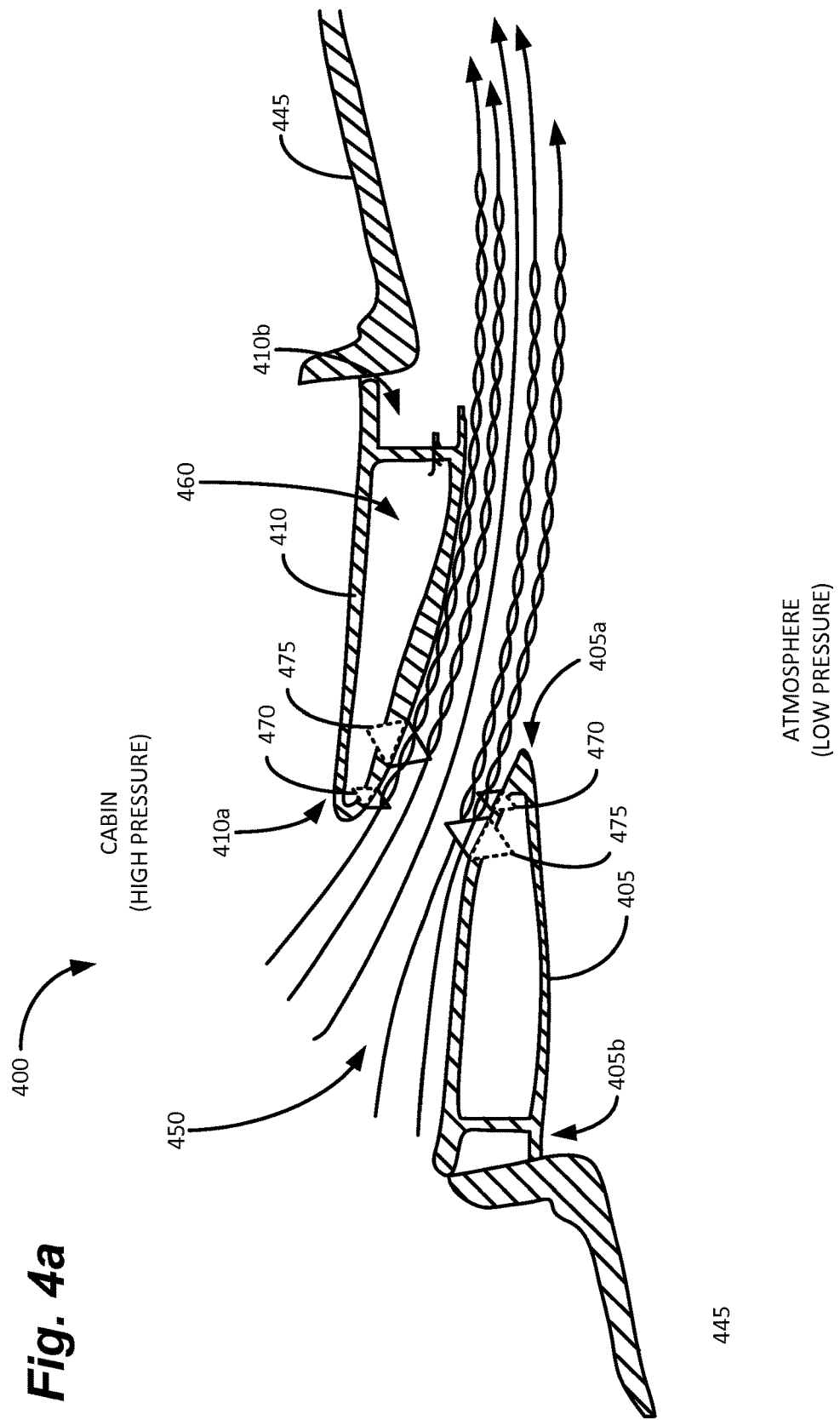

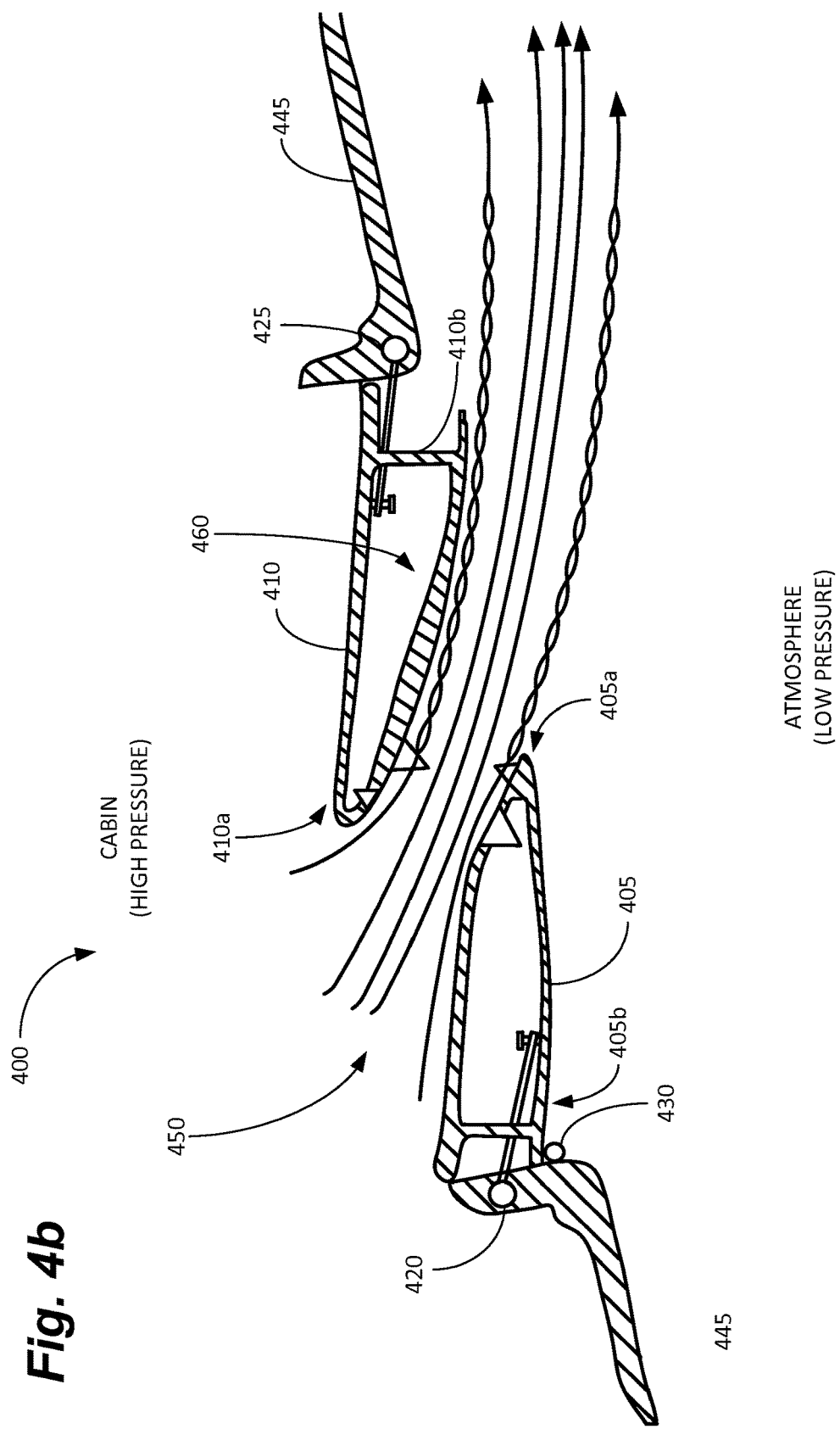

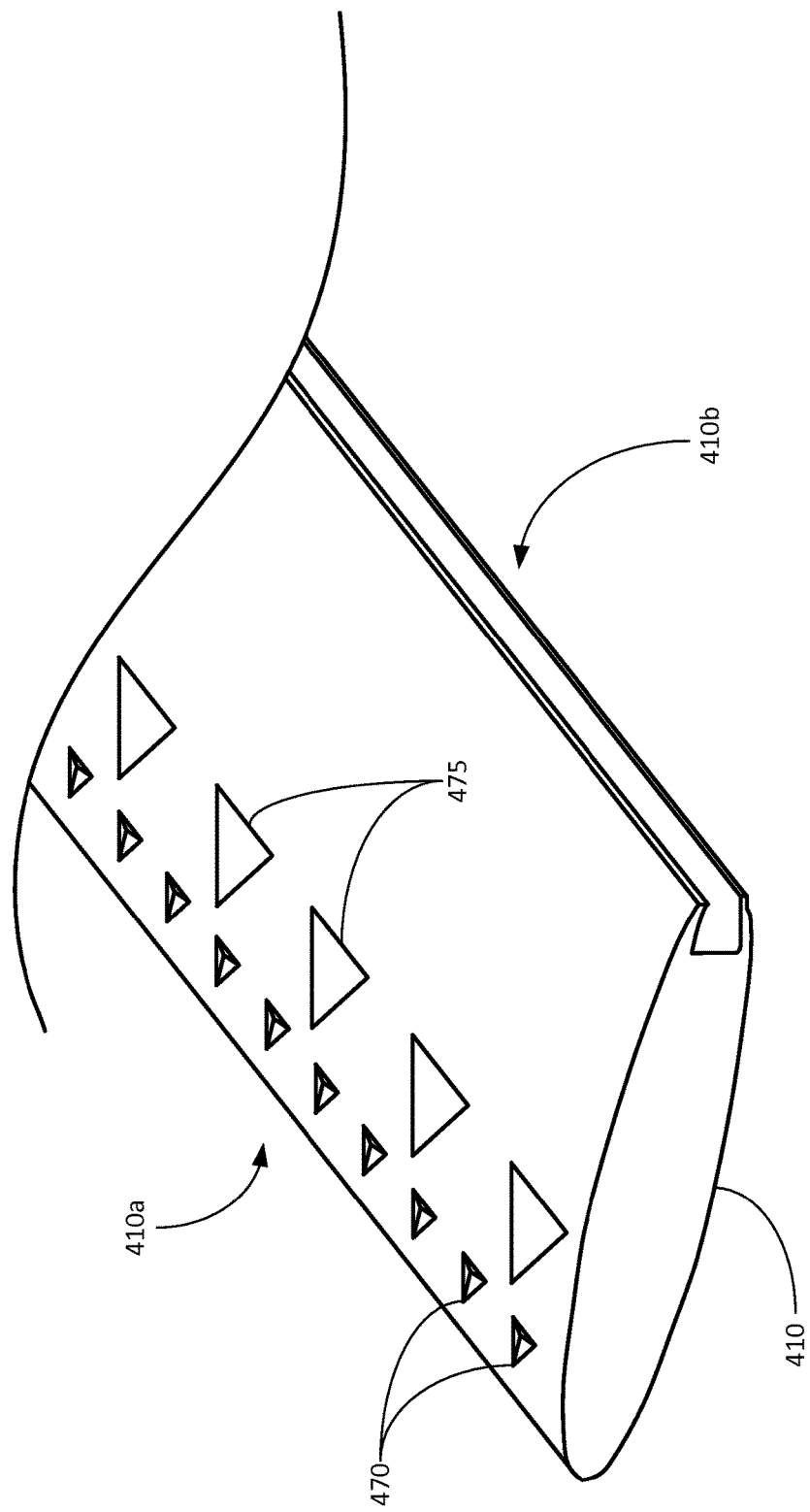

CABIN PRESSURE OUTFLOW VALVE NOISE SUPPRESSION DEVICES AND METHODS

FIELD

Embodiments of the present disclosure relate generally to cabin pressure outflow valves and specifically to improved cabin pressure outflow valves for aircraft utilizing fixed and/or moveable aerodynamic elements for the reduction, or elimination, of tonal and/or broadband noise.

BACKGROUND

Commercial aircraft fly at very high altitudes. This is because, at least in part, the relatively thinner air at higher altitudes reduces drag. As a result, modern commercial aircraft fly in the range of approximately 30,000-45,000 feet above sea level (ASL), while private jets may fly as high as approximately 51,000 feet ASL. And, while flying at this altitude increases efficiencies, it also requires that some technical difficulties to be overcome.

One of these difficulties is that the air at these altitudes does not contain enough oxygen to sustain human life. At altitudes above approximately 12,000-14,000 feet ASL, most humans begin to suffer from altitude induced hypoxia. Early solutions to this problem included oxygen mask systems for providing additional oxygen directly to users. Such systems are still used in fighter aircraft, for example, where oxygen need only be provided for one or two users. In large commercial aircraft, however, oxygen mask systems are impractical due to, for example, the number of passengers, size and space requirements, and the need for passengers and flight attendants to be able to move about the cabin.

A more practical solution to this problem is to pressurize the cabin. This enables the cabin to simulate conditions at lower altitudes (generally, similar conditions to those found at somewhere between 4,500 and 8,000 feet ASL). This feature was introduced in 1938 on the Boeing 307—the first commercial airliner with a pressurized cabin.

Conventionally, pressurized and conditioned air is supplied into the cabin and is provided by, for example, bleed air from the compressor side of a turbine engine. The pressure in the cabin is then controlled using a Cabin Pressure Outflow Valve (CPOV). Because the atmospheric pressure decreases with altitude, the pressure differential between the pressurized interior of the cabin and the atmosphere increases with altitude. This results in subsonic flow through the CPOV at lower pressure differentials. Ideally, for maximum thrust recovery, the CPOV gate surfaces will be smooth. However, this can result in flow separation, which can result in tonal noise. At low differential pressures, the tonal noise can propagate into the airplane cabin. At higher altitudes, however, the increased pressure differential increases the velocity of the flow, often to supersonic levels, which prevents the tonal noise from entering the airplane cabin.

Conventional CPOVs often have fixed aerodynamic devices. These devices in various combinations can be used to prevent flow separation, for example, to reduce tonal noise at lower differential pressures (e.g., during take-off, climb, descent, and landing). The tonal noises (e.g., whistles or whines) created during these flight regimes are particularly bothersome to passengers and crew and should be eliminated, to the extent possible, in commercial aircraft.

These fixed aerodynamic devices, however, can produce additional broadband noise at lower and higher differential pressures (e.g., during the full flight regime) and also represent a possible flow inefficiency through the CPOV. As a result, while these devices are deployed at all times (i.e., because they are molded into the gate, for example), they are only needed in fairly limited conditions (i.e., only during fairly small portions of the flight regime). The tonal noise at lower differential pressures, for example, is transitory; yet, the fixed aerodynamic devices can result in increased broadband noise even when no tonal noise is present. Thus, implementing retractable aerodynamic devices will result in reduced broadband noise and improved thrust recovery for a large portion of the flight regime.

It is with such considerations in mind that embodiments of valves for pressurized aircraft cabins are described.

SUMMARY

It should be appreciated that this Summary is provided to introduce a selection of concepts in a simplified form that are further described below in the Detailed Description. This Summary is not intended to be used to limit the scope of the claimed subject matter.

Embodiments of the present disclosure relate to a Cabin Pressure Outflow Valve (CPOV) having retractable aerodynamic features configured to reduce cabin noise and improve flow efficiency, among other things.

Embodiments of the present disclosure can comprise a valve for regulating the interior pressure of a vehicle. In some embodiments, the valve can comprise a first gate, positionable between a closed position and an open position, and comprising a plurality of disruptors, located proximate a leading edge of the first gate, at least a first portion of the plurality of disruptors positionable between a retracted position and a deployed position.

Embodiments of the present disclosure can also comprise a system for regulating the interior pressure of a vehicle. In some embodiments, the system can comprise a valve comprising a first gate, positionable between a closed position and an open position, the first gate comprising a first plurality of disruptors positionable between a retracted position and a deployed position and a gate actuator coupled to the first gate and operable to move the first gate between the closed position and the open position. The system can also comprise a controller configured to transmit signals to the actuator for controlling the movement of the first gate.

Embodiments of the present disclosure can also comprise a method of operating a valve. The method can comprise moving a first gate of a valve arranged in fluid communication with an interior and exterior of a vehicle between a closed position and an open position to allow air to flow out of the interior of the vehicle. In some embodiments, the first gate can comprise a first plurality of flow disruptors positionable between a deployed position and a retracted position. In this manner, the turbulence of a first portion of the air flow can be increased by the first plurality of flow disruptors energizing a boundary layer of flow around the first gate.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIGS. 1a and 1b compare flow velocities over a surface in laminar (FIG. 1a) and turbulent flow (FIG. 1b).

FIG. 4a depicts a side cross-sectional view of a Cabin Pressure Outflow Valve (CPOV) incorporating moveable flow disruptors in accordance with the present disclosure with small flow disrupters and large flow disrupters on an aft gate and a forward gate in deployed positions;

FIG. 4b depicts the CPOV of FIG. 4a with the small flow disrupters in deployed positions and the large flow disrupters in retracted positions;

FIG. 4d depicts the portion the aft gate of FIG. 4c with the small flow disrupters in the deployed positions and the large flow disrupters in the retracted positions;

Each figure shown in this disclosure shows a variation of an aspect of the embodiment presented, and only differences will be discussed in detail.

DETAILED DESCRIPTION

Embodiments of the present disclosure relate generally to Cabin Pressure Outflow Valves (CPOVs), and more particularly to a system and method for use with CPOVs utilizing moveable flow disrupters configured to reduce noise and improve flow efficiency therethrough. In some embodiments, the system can comprise a CPOV with one or more aerodynamic features, or flow disrupters, to reduce separation of the flow through the valve. The system can comprise, for example, one or more fixed aerodynamic surfaces and/or one or more moveable aerodynamic surfaces to attenuate tonal noise. One or more of these aerodynamic surfaces can be moveable, or retractable, to reduce broadband noise, which can be caused by flow across the flow disrupters themselves, among other things.

To simplify and clarify explanation, the disclosure is described herein as a CPOV. One skilled in the art will recognize, however, that the disclosure is not so limited. The system can be used, for example and not limitation, with other types of valves in which a pressure differential exists from one side of the valve to the other (as is generally the case). The disclosure could be used to improve flow and reduce noise for various types of valves such as, for example and not limitation, pressure relief valves, pneumatic tools, and venting systems.

The materials described hereinafter as making up the various elements of the present disclosure are intended to be illustrative and not restrictive. Many suitable materials that would perform the same or a similar function as the materials described herein are intended to be embraced within the scope of the disclosure. Such other materials not described herein can include, but are not limited to, materials that are developed after the time of the development of the disclosure.

Figure 3:
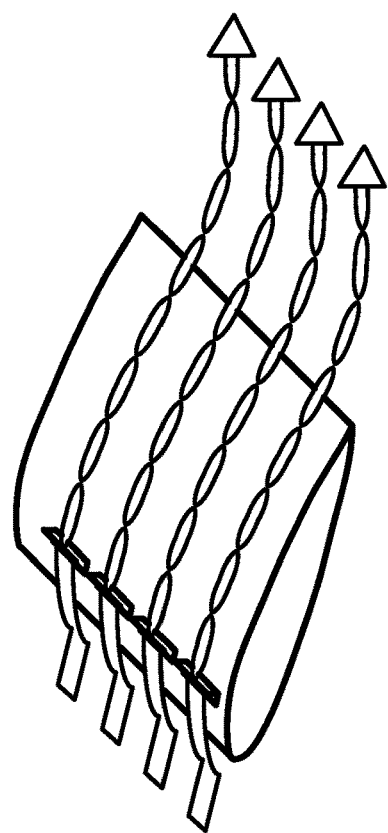
FIGS. 2 and 3 compare a boundary layer without flow disruptors (FIG. 2) and with flow disruptors (FIG. 3).
Figure 2:
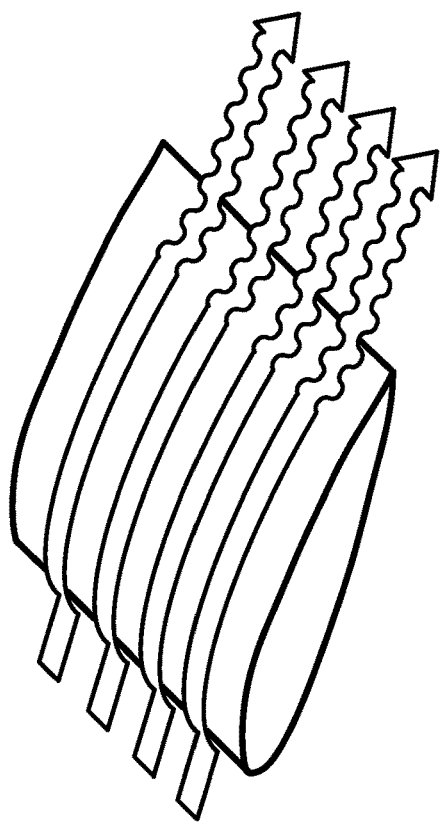

Because the relative air flow over any surface must be zero at the surface, a boundary layer is formed above the surface. The boundary layer consists of the layers of air that are required to go from the velocity of an external air flow to zero at the surface. As shown in FIG. 1a, the boundary layer may be laminar, in which each layer of air in the boundary layer smoothly adheres to the next layer, and the velocity slows to zero in a substantially smooth and parabolic manner from top to bottom. In other instances, however, as shown in FIG. 1b, some or all of the boundary layer may be turbulent. As shown in FIGS. 2 and 3, however, because of the increased energy in a turbulent boundary layer, a turbulent boundary layer generally stays "attached" to the surface over a longer distance (FIG. 3), delaying separation of the boundary layer (FIG. 2). Thus, by adding flow disrupters to the valve, energy can be introduced into the boundary layer flow, reducing or eliminating flow separation.

As discussed above, one problem with conventional CPOVs is that little or no effort is made to actively manage the air flow through the valve during operation. As a result, the flow may separate from the valve, which can result in undesirable tonal noise inside the passenger cabin and which can reduce thrust recovery. To dampen noise emanating from the CPOV, heavy and expensive insulation materials or active sound mitigation electronics can be used, but these undesirably increase the cost and weight of the aircraft. In some cases, as mentioned above, fixed aerodynamic devices can dampen tonal noise, but generally increase broadband noise, and further reduce thrust recovery.

Figure 10:
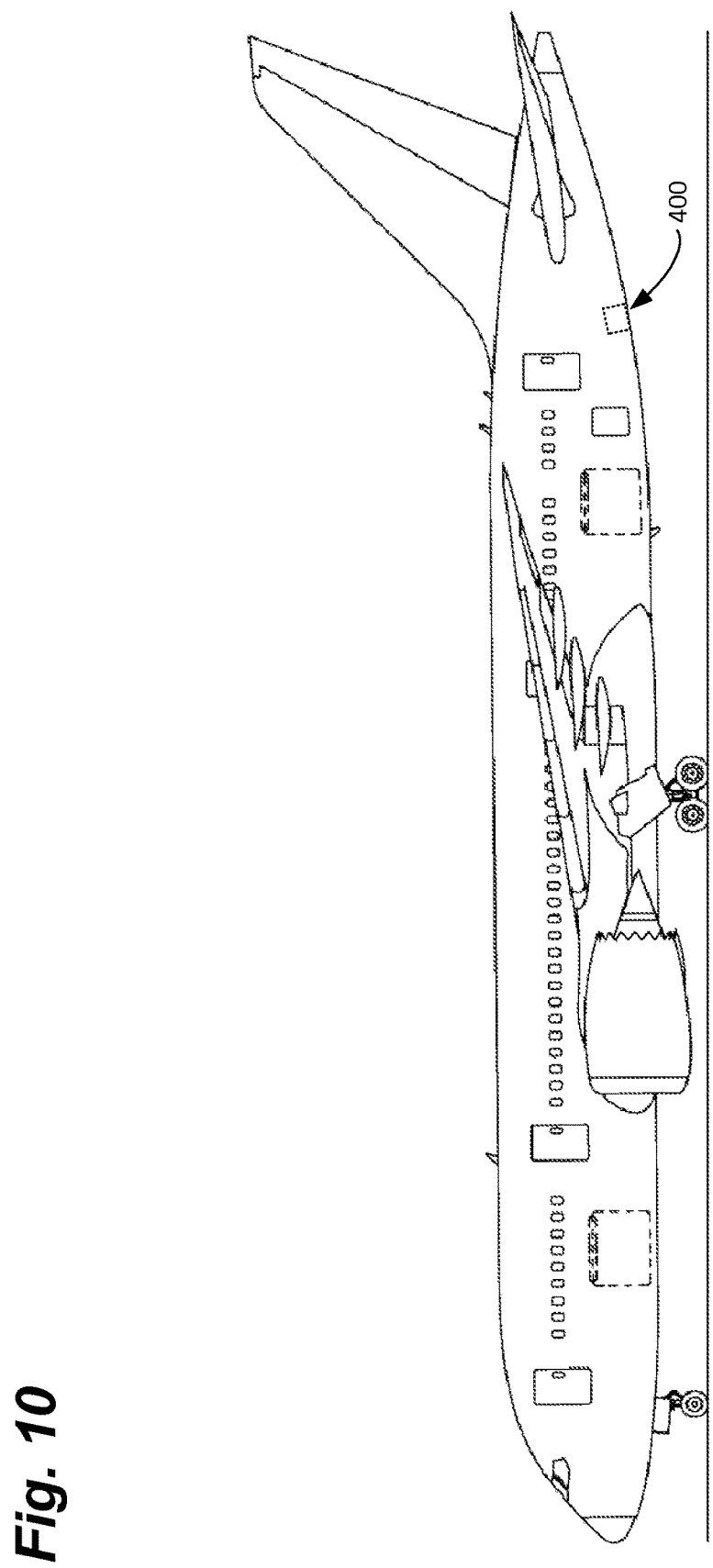
FIG. 10 depicts one location of where the system may be located on an aircraft, in accordance with some embodiments of the present disclosure.

With such considerations in mind, as shown in FIGS. 4a-4f, embodiments of the present disclosure relate to systems and methods for managing and/or improving air flow efficiency and reducing noise through a CPOV. In some embodiments, the system 400 can comprise a plurality of small 470 and/or large 475 flow disrupters on a forward gate 405, aft gate 410, or both of a CPOV. In some embodiments, these flow disrupters 470, 475 can be active, passive, or a combination of the two. The system 400 can comprise a forward gate 405 and an aft gate 410 that, when open, form a vent 450 from an interior portion of the aircraft (i.e., the cabin) to an exterior portion of the aircraft (i.e., the atmosphere). One or both of the gates 405, 410 can be opened and closed to control cabin air pressure. The gates 405, 410 can be constructed of light, strong materials such as, for example and not limitation, aluminum, aluminum honeycomb, composite materials (e.g., fiberglass, carbon fiber, and Kevlar®), or combinations thereof. In some embodiments, the gates 405, 410 can comprise one or more interior cavities 460. In some embodiments, the system 400 can be located proximate an aft portion of the fuselage of an aircraft (See, e.g., FIG. 10). Of course, other locations are possible and are contemplated herein.

In some embodiments, the forward gate 405 may be pivotally coupled to the aircraft to enable a first end, or trailing edge, 405a of the forward gate 405 to be pivoted about the second end 405b of the forward gate 405. Similarly, the aft gate 410 can be pivotally coupled to the aircraft to enable a first end, or leading edge, 410a of the aft gate 410 to be pivoted about the second end, or trailing edge, 410b of the aft gate 410. In other embodiments, the forward gate 405 and/or the aft gate 410 may be pivotally coupled to the aircraft at an intermediate location along the length of the gates (e.g., at a location between the first ends 405a, 410a and the second ends 405b, 410b of the forward gate 405 and aft gate 410, respectively) in a butterfly-type valve configuration. The gates 405, 410 can be coupled to the aircraft using, for example and not limitation, hinges, pins, frames, or pivot arms.

In this manner, the vent 450 provided by the gates 405, 410 can be varied, and can be adjusted in conjunction with feedback from, for example, a cabin pressure sensor or noise sensor, to maintain the desired cabin pressure and adjust noise levels/frequency. The pressure differential from the inside of the cabin (high pressure) to the atmosphere (low pressure) causes air flow through the system 400 as the pressures attempts to equalize through the gates 405, 410.

The gates 405, 410 can be moved from a first, open position to a second, partially closed position by one or more actuators. The actuators 420, 425 can comprise, for example and not limitation, servo motors, linear servos, or pneumatic or hydraulic actuators. In some embodiments, the actuators 420, 425 can comprise brushless DC motors (e.g., permanent magnet synchronous motors, switched reluctance motors, or induction motors). In some embodiments, one or both of the gates 405, 410 can further comprise one or more gate position sensors 430, 435 to provide feedback as to the current position of the gates 405, 410. The gate position sensors 430, 435) can comprise, for example and not limitation, potentiometers, Hall Effect sensors, or capacitive transducers. In other embodiments, such as when a servo motor is utilized, the gate position sensors 430,435 can be integral to the actuators 420, 425.

As shown in FIG. 4b, in some embodiments, small flow disruptors 470, or trips, can be used, for example, proximate the trailing edge 405a of the forward gate 405 and leading edge 410a of the aft gate 410. In this configuration, the small flow disruptors 470 can be configured to reduce tonal noise though the valve in higher differential pressure conditions (e.g., at high altitudes). In other embodiments, large flow disruptors 475 can be positioned slightly farther from the trailing edge 405a of the forward gate 405 and leading edge 410a of the aft gate 410 and can be configured to suppress tonal noises through the vent 450. Both large 475 and small 470 disruptors can be used alone, or in combination, to suppress tonal noises, as necessary for a particular flight regime.

Flow disruptors 470, 475 are generally physical structures (e.g., pyramids or airfoils, or other shapes with the intent to treat the air flow to reduce tonal noise) and are typically mounted in the front third of the aerodynamic surface (e.g. near the trailing edge 405a of the forward gate 405 and the leading edge 410a of the aft gate 410. In some embodiments, the flow disruptors 470, 475 can be located on the upper surface 407 of the forward gate 405, the lower surface 409 of the forward gate 405, or both. The flow disruptors 470, 475 can be sized and shaped to generate instabilities in the boundary layer at a predetermined frequency.

Of course, the flow disruptors 470,475 can be located in other areas on the gates 405, 410 and can be placed in locations of likely flow separation, or "flow separation areas." As a result, the placement of flow disruptors 470, 475 is not limited to leading or trailing edges of the gate 405, 410, for example, but can be anywhere on the gate that flow separation is likely to occur. This can be, for example, in a location where there is a change in geometry or curvature of the gate 405, 410. In addition, in some embodiments, flow disruptors 470, 475 may be located only on the forward gate 405 and not on the aft gate 410, or vice-versa, depending on the specific configuration.

Ironically, these instabilities, or fluctuations, actually act as boundary layer stabilizers. In other words, flow disruptors, whether active or passive, create turbulence in the boundary layer, by introducing higher energy air flow into the boundary layer. This turbulence, in turn, can delay and/or prevent flow from separating from the valve. On aircraft, for example, vortex generators can be designed reduce, or eliminate, flow separation at the aircraft's cruising speed and altitude to reduce drag and fuel consumption.

Figure 4C:
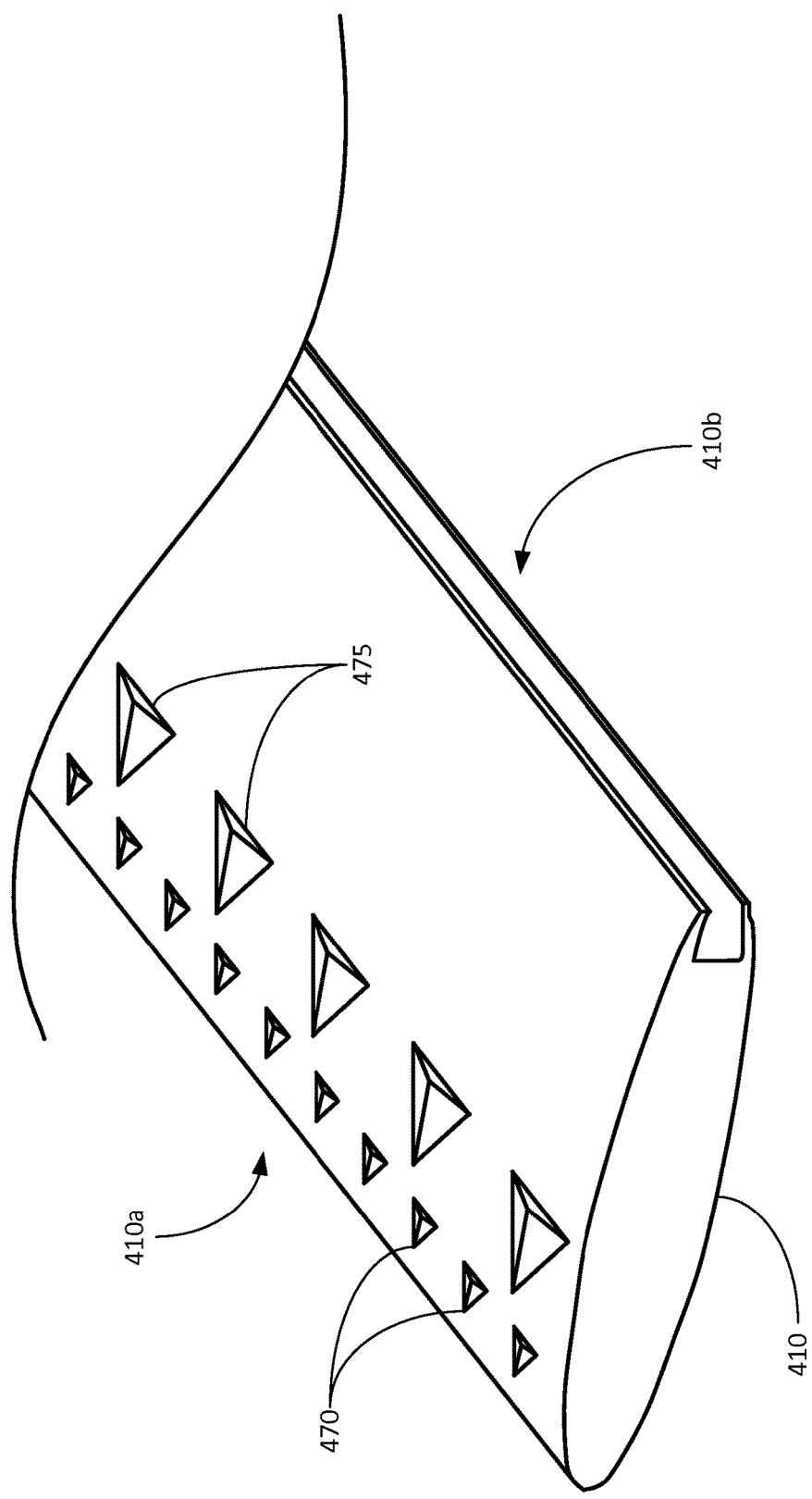
FIG. 4c depicts an isometric view of a portion the aft gate of the CPOV of FIG. 4a with the small flow disrupters and the large flow disrupters in the deployed positions.
Figure 4E:
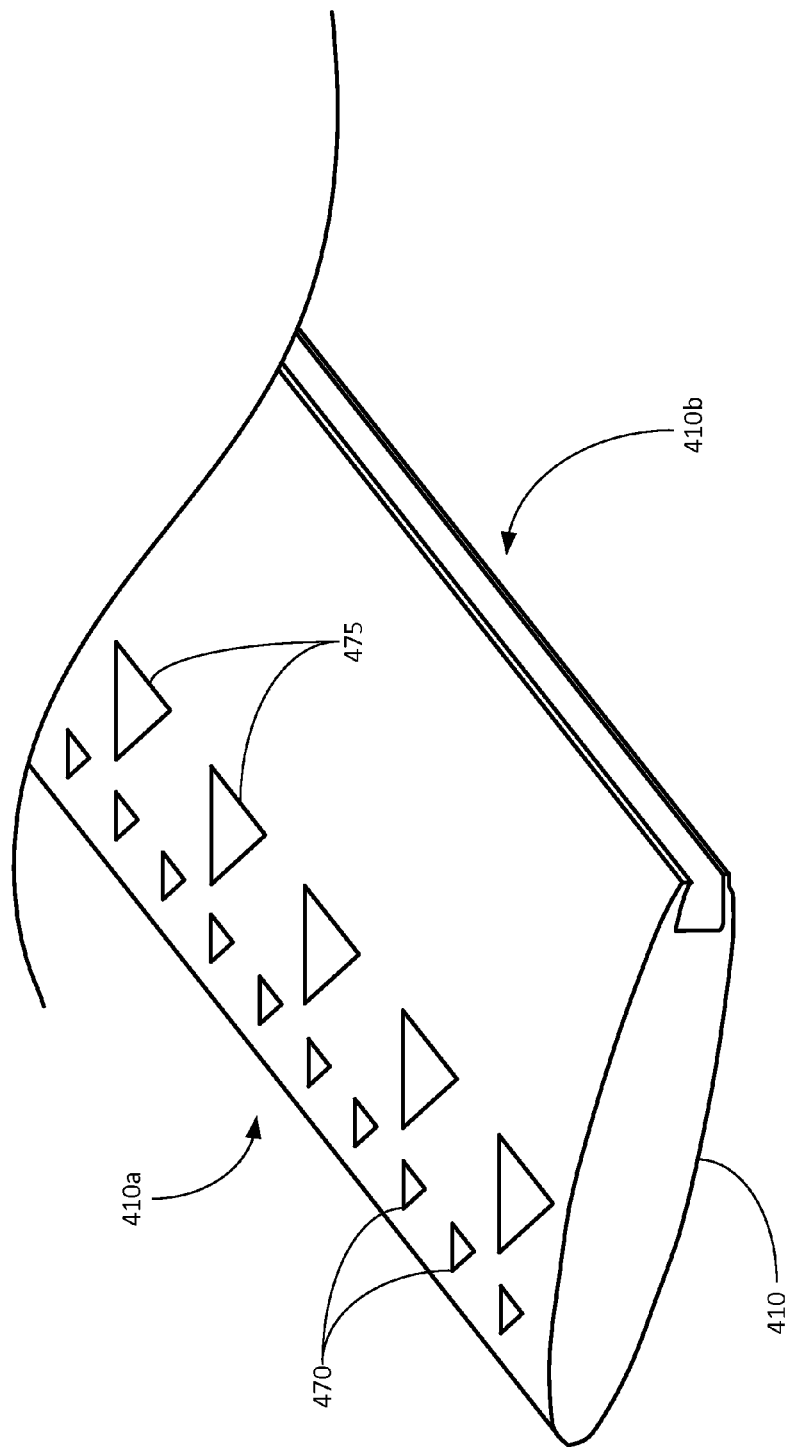
FIG. 4e depicts the portion the aft gate of FIG. 4c with the small flow disrupters and the large flow disrupters in the retracted positions.

As shown in FIGS. 4b-4e, the small flow disruptors 470, large flow disruptors 475, or some or all of both 470, 475 can be moveable between a first, retracted position and a second, deployed position. In this manner, the large flow disruptors 475 can be deployed, for example, to quell tonal noise at lower differential pressures and then to retracted at higher differential pressures to improve flow efficiency, reduce broadband noise and, in some cases, increase thrust recovery. Similarly, the smaller disruptors 470 can be deployed at higher differential pressures to reduce tonal noise, but retracted when tonal noise is not present to further smooth flow. In some embodiments, such as when the pressure differential is very high, all flow disruptors 470, 475 can be placed in the retracted position to maximize thrust recovery and minimize broadband noise, as shown in FIG. 4e.

Figure 4F:
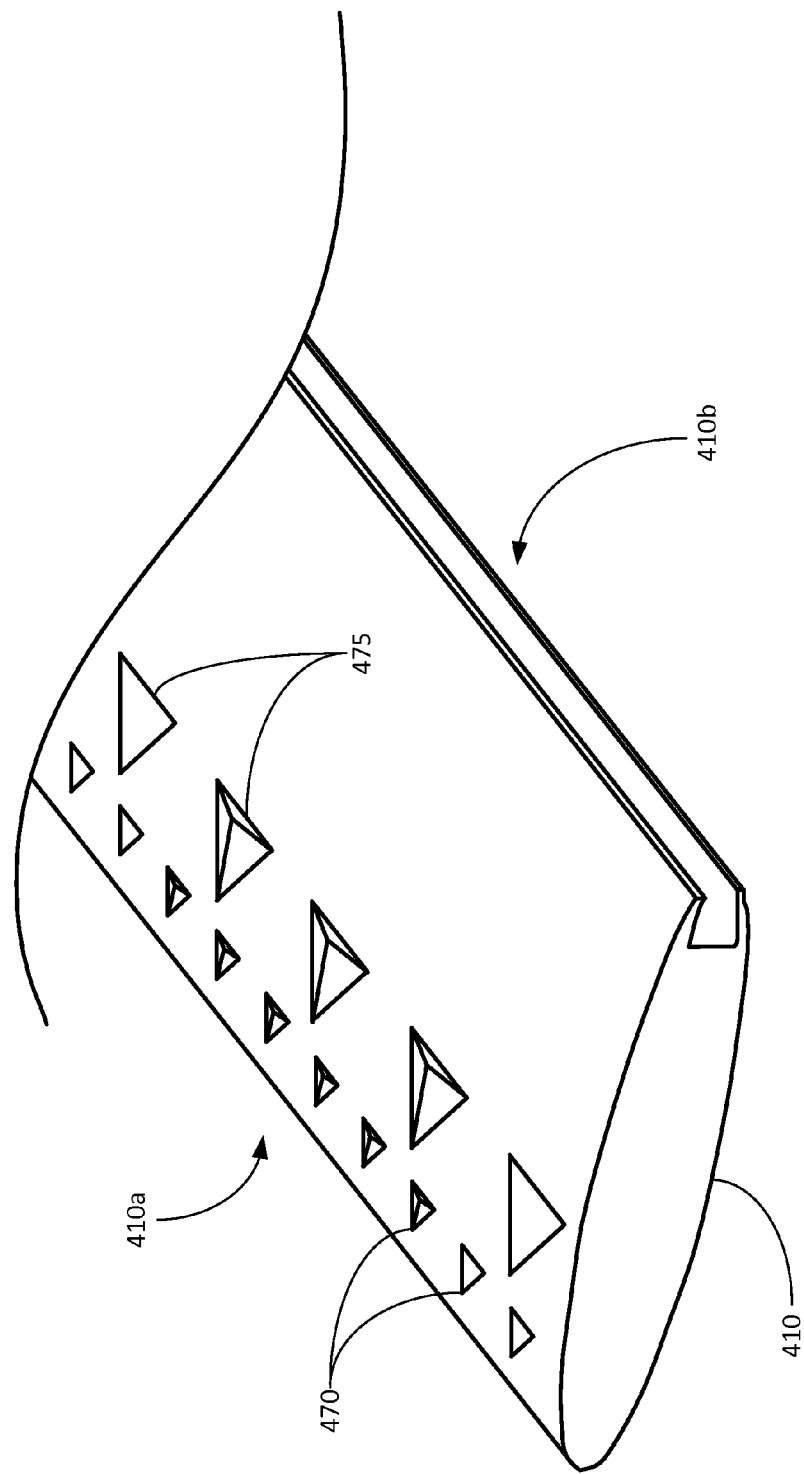
FIG. 4f depicts the portion the aft gate of FIG. 4c with some of the small flow disrupters in the deployed positions, the remainder of the small flow disrupters in the retracted positions, some of the large flow disrupters in the deployed position, and the remainder of the large flow disrupters in the retracted positions.

In other embodiments, as shown in FIG. 4f, a first portion of the large flow disruptors 475 and a first portion of the small flow disruptors 470 can be deployed, while a second portion of the flow disruptors 470, 475 can be retracted. In this configuration, flow over the gates 405, 410 can be tailored for specific flight regimes. In still other embodiments, some of the flow disruptors 470, 475 can be moveable and others can be fixed. As shown, the flow disruptors 470, 475 are preferably aligned substantially perpendicular to the direction of the flow.

It will be appreciated that the terms forward and aft, when describing the gates 405, 410, and the terms top and bottom, when describing the exterior surfaces of the gates 405, 410, are used for illustration purposes only and do not limit the scope of the present disclosure. For example, in some embodiments, in which the system 400 is arranged along a lower portion of an aircraft fuselage, the gates may be oriented as depicted in FIGS. 4a-4d. In some examples, such as when the system 400 is positioned elsewhere along the fuselage (e.g., sides or upper surfaces of the fuselage) or coupled to other portions of a vehicle, the gates may be oriented differently, thus the terms "top" and "bottom" as wells as "forward" and "aft" are not intended to limit the scope of the disclosure.

Figure 5:
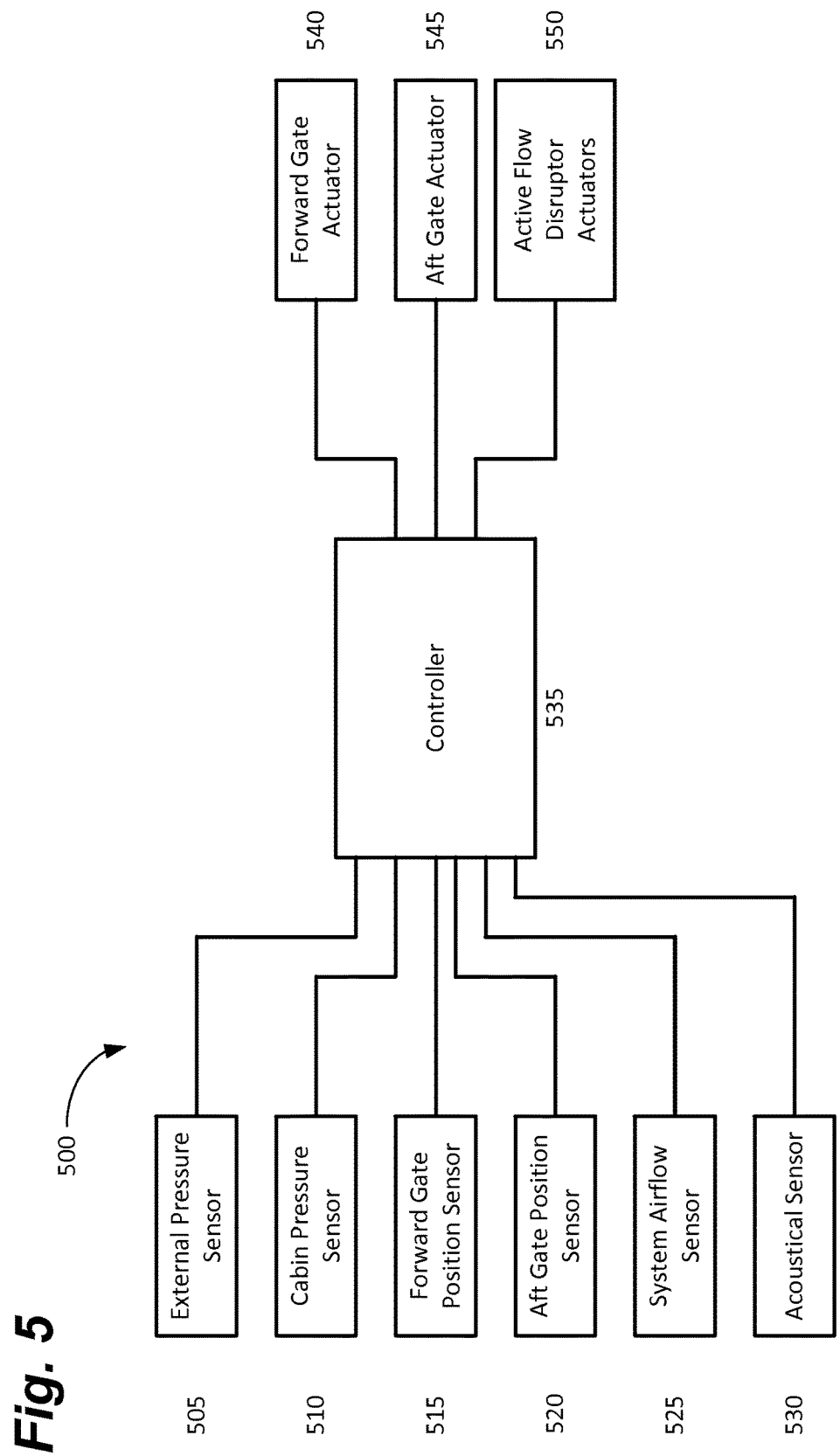
FIG. 5 depicts a control system for maintaining the cabin pressure of a vehicle with reduced noise, in accordance with some embodiments of the present disclosure.

As shown in FIG. 5, embodiments of the present disclosure can also comprise a control system 500 for maintaining cabin pressure with reduced noise. The control system 500 can comprise a number of inputs including, for example, an external (or, "atmospheric") pressure sensor 505, an internal (or, "cabin") pressure sensor 510, a forward gate position sensor 515, and an aft gate position sensor 520. In some embodiments, the control system 500 can also use one or more air flow sensors. In some embodiments, the control system 500 can use, for example, an air flow sensor 525 for measuring the total flow through the system. In some embodiments, the control system 500 can also use an acoustical sensor 530 to measure the tonal noise, broadband noise, or both, of the flow passing through the system.

The control system 500 can also comprise a controller 535 for receiving inputs from the various sensors and providing various outputs to maintain the desired cabin pressure. The controller 535 can comprise, for example and not limitation, a CPU, microcontroller, or integrated circuit (e.g., a field programmable gate array (FPGA) or application specific integrated circuit (ASIC). In use, if, for example, the control system 500 is set to maintain 8000 feet ASL and the cabin pressure sensor 510 measures a cabin pressure equivalent to 7,800 feet ASL, the controller can actuate the forward gate actuator 540, the aft gate actuator 545, or both to reduce the cabin pressure. Of course, the converse is also true and, if the cabin pressure is too low (e.g., 8,200 feet ASL), the gates can be closed partially to increase cabin pressure.

In some embodiments, the controller 535 can position the gates based on feedback from the air flow sensor 525. In other words, if the cabin pressure is too high, for example, (e.g., the cabin pressure supply valve is jammed) the gates may be positioned to a more open position, regardless of feedback from the noise sensor. If, on the other hand, the system is in normal operation, the controller 535 may adjust the position of the gates and/or flow disruptors to minimize tonal noise, broadband noise, or both.

To control cabin pressure, the outputs for the controller 535 can be an open or close signal to the forward gate actuator 540, the aft gate actuator 545, or both. In addition, the controller 535 can also monitor air flow through the system using the air flow sensor 525 and the noise created by the system using the acoustical sensor 530. If the signal from the acoustical sensor 530 is above a predetermined range (i.e., the system is too "loud," either tonally or overall) the controller 535 can also send an open/close signal to the one or more flow disruptors 550. Deploying, or actuating, one or more of the flow disruptor actuators 550, for example, can reduce tonal noise, while retracting one or more of the flow disruptor actuators 550 can reduce broadband noise. In this manner, the total flow through the system can be monitored, while noise is reduced.

In some embodiments, the comparison of the two pressure sensors 505, 510 along with feedback from the position sensors 515, 520 can be used to calculate the air flow through the system indirectly (i.e., the area of the opening between the gates is known for each gate position). In other embodiments, the air flow rate can be measure directly (or redundantly) with the air flow sensor 525. In some embodiments, the controller 535 can include predetermined gate and disruptor positions based on flow rate, pressure differential, altitude, or other factors. In other embodiments, the controller 535 can vary these parameters based partly, or solely, on feedback from the various sensors (i.e., "closed loop" operation).

Figure 6A:
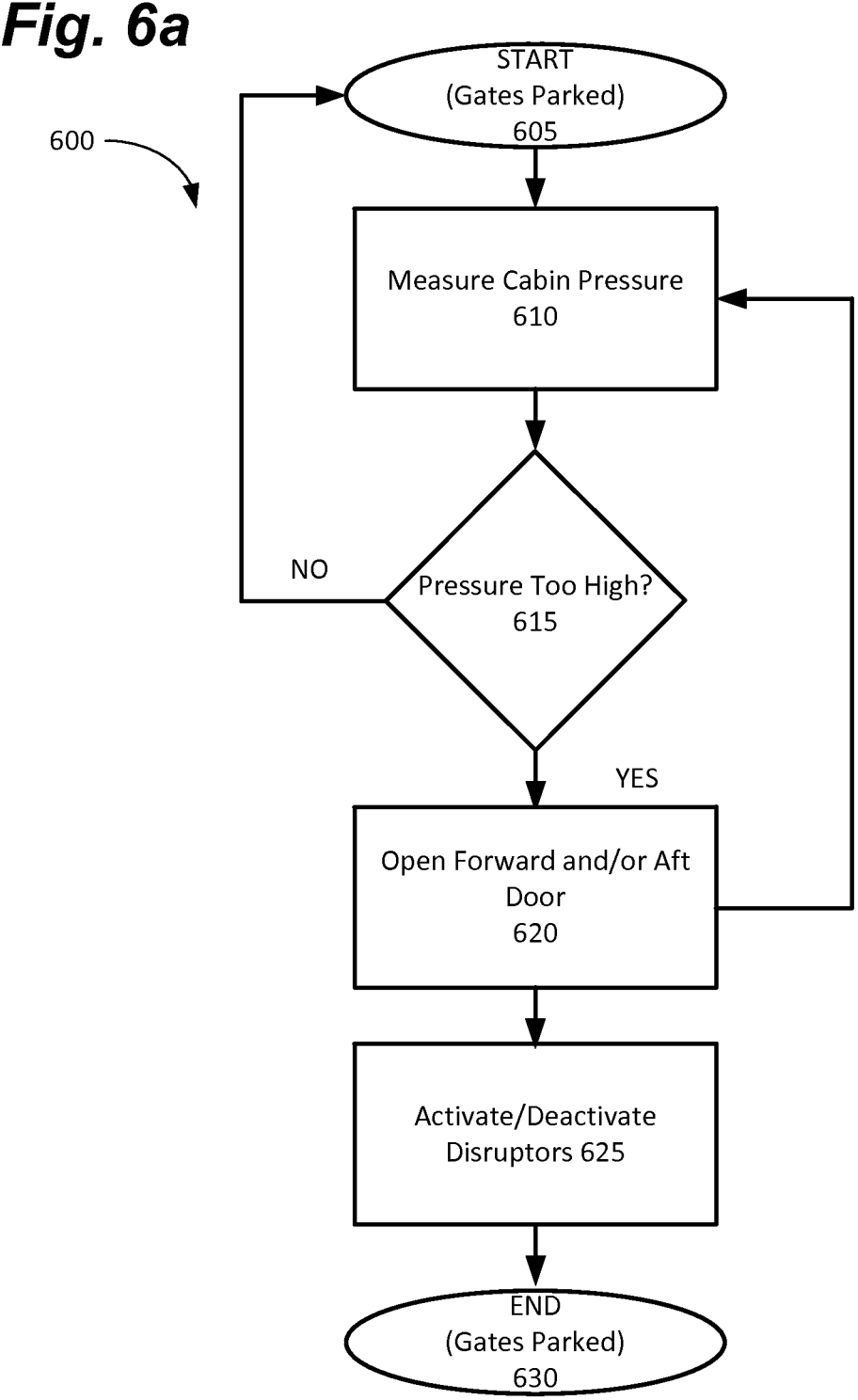
FIG. 6a is a flowchart depicting a method for controlling the cabin pressure of a vehicle, in accordance with some embodiments of the present disclosure.
Figure 6B:
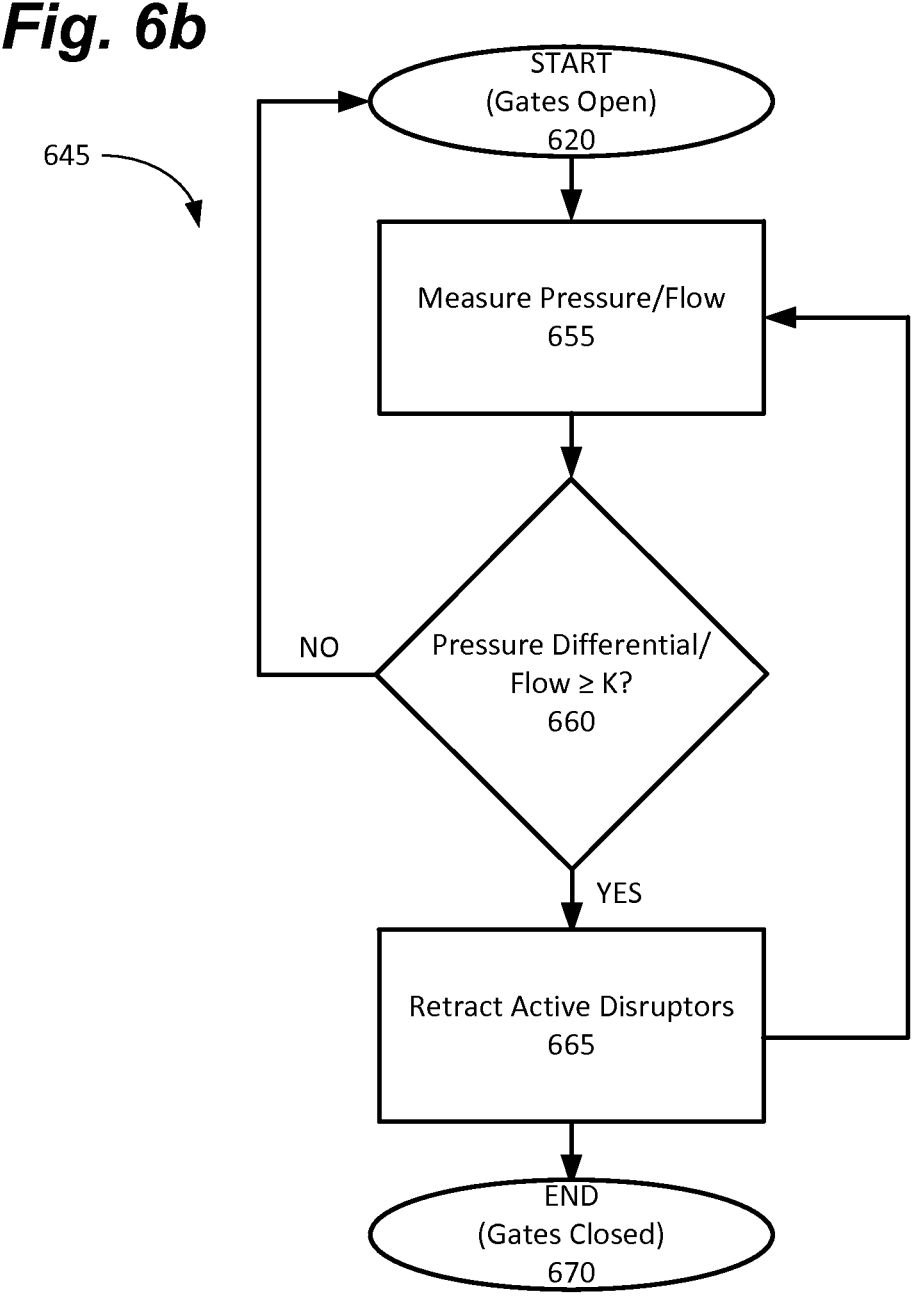
FIG. 6b is a flowchart depicting a method for controlling noise on a CPOV, in accordance with some embodiments of the present disclosure.

With reference to FIGS. 6a and 6b, methods for managing air flow, noise, and efficiency through a CPOV are described. As shown in FIG. 6a, the method 600 can comprise a feedback method in which cabin pressure is measured continuously, or at predetermined intervals (e.g., once per second), and is adjusted by opening and closing the forward gate, the aft gate, or both. The method can begin, for example, with both gates in a "parked position" (e.g., either open or closed) and the cabin unpressurized, as shown at 605. The gates may be open, for example, when the aircraft is at the airport departure gate and the aircraft has not yet been pressurized prior to flight. The gates may be closed if the aircraft is parked, for example, to prevent entrance through the gates (e.g., by insects or other animals or for security reasons). As the outer passenger door(s) of the aircraft are closed and sealed, the method 600 may continue by measuring the cabin pressure, as shown at 610, to determine if the cabin pressure is above or below a predetermined pressure, as shown at 615 (e.g., approximately the ground pressure while on the ground or up to approximately 8,000 feet ASL during normal flight operation).

If the pressure is determined 615 to be below the predetermined pressure, the forward and aft gates can be moved to (or remain in) a more closed position 620b to enable a pressurization system of the aircraft to raise the cabin pressure. If, on the other hand, the cabin pressure is determined 615 to be above the predetermined pressure, for example, the forward and/or aft gates can be opened, as shown at 620a, to vent excess cabin pressure into the atmosphere. In some embodiments, when the aircraft has completed its journey, the cabin and atmospheric pressure can be equalized and the gates can be moved back to their parked position, as shown at 625, which is generally open on the ground. Of course, the gates can be closed for security, if necessary, as discussed above.

With reference to FIG. 6b, a method 645 for controlling noise and flow through the CPOV is described. As shown at 650, the method may begin with one or more of the gates in an open position. The pressure (or flow) through the system can be measured with a flow and/or pressure sensor, as shown at 655. If the pressure through the system is determined 660 to be below a predetermined pressure differential, K, one or more disruptors can be deployed 665a to reduce tonal noise through the valve. If, on the other hand, the pressure through the system is determined 660 to be above the predetermined pressure differential, K, one or more of the disruptors can be retracted, as shown at 665b, to reduce, or eliminate, broadband noise caused by the disruptors when conditions do not indicate tonal noise. In some embodiments, this "cross-over" point, or the point where the flow becomes "choked," can be given by equation 1:

$$p_d = 0.528 * p_u \quad (1)$$

where $p_d$ represents the downstream pressure and $p_u$ represents the upstream pressure.

In some embodiments, a first portion of the flow disruptors can be retracted at a first predetermined differential pressure and then a second portion of the flow disruptors (or all remaining flow disruptors) can be retracted at a second differential pressure. In other embodiments, the system can retract and deploy flow disruptors based on fixed programs. In still other embodiments, the system can retract and deploy disruptors based on a combination of one or more predetermined programs and feedback from one or more sensors. As shown at 670, the process terminates when the gates are closed (i.e., because there is no flow through the valve), for example, or the flight ends, as shown at 670.

Figure 7:
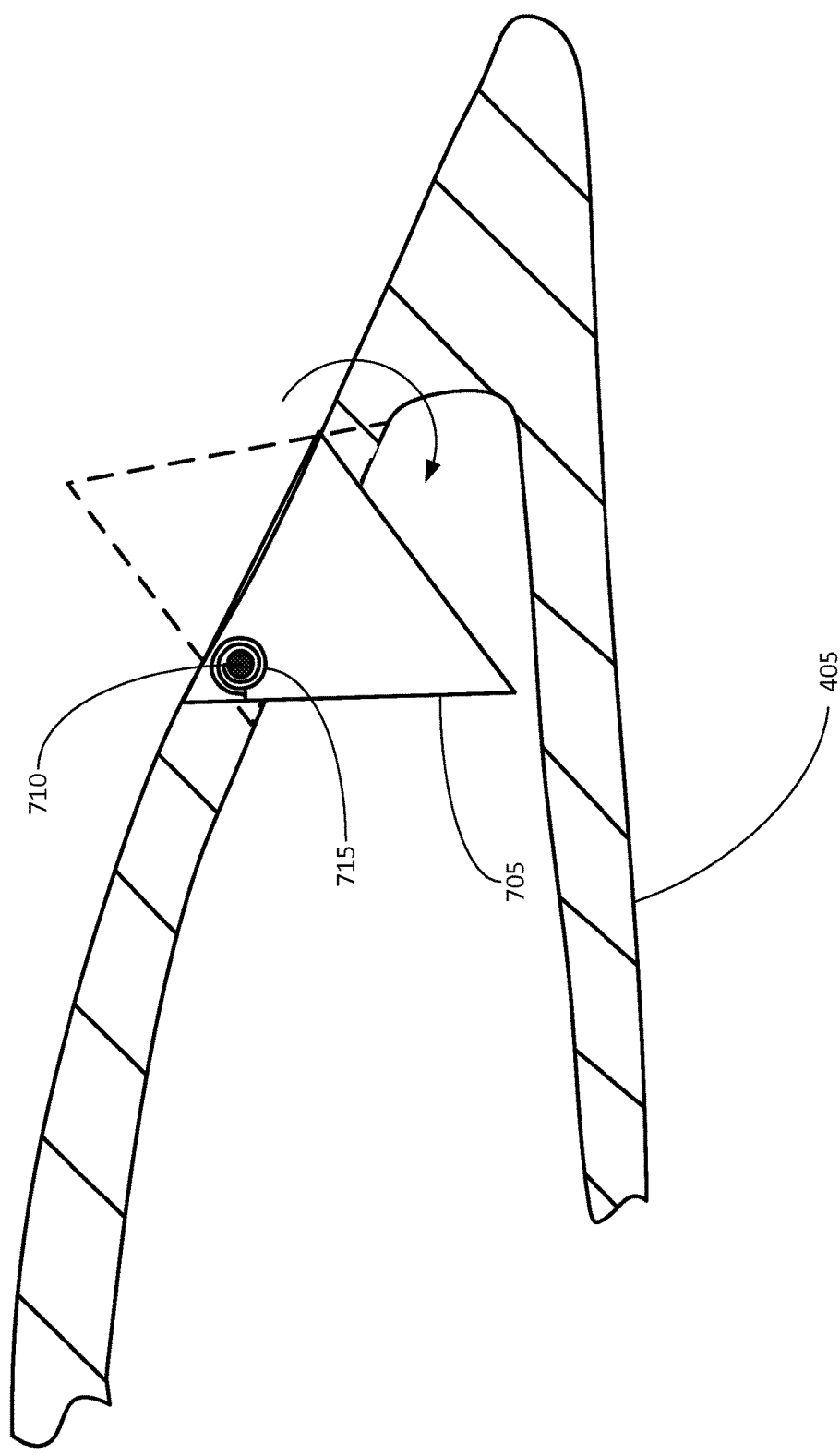
FIG. 7 depicts a Cabin Pressure Outflow Valve (CPOV) incorporating spring-biased flow disrupters, in accordance with some embodiments of the present disclosure.
Figure 8:
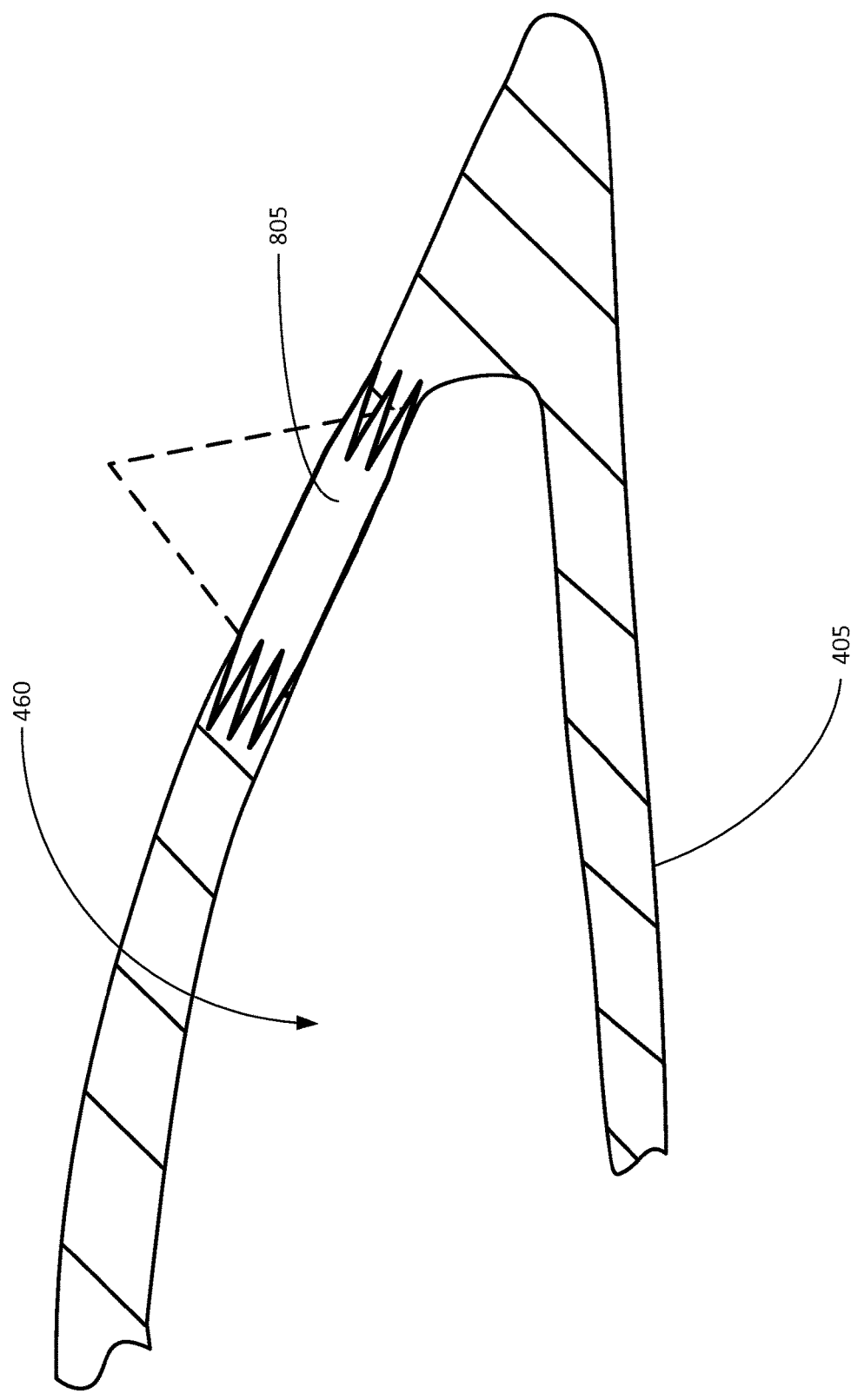
FIG. 8 depicts a Cabin Pressure Outflow Valve (CPOV) incorporating inflatable flow disrupters, in accordance with some embodiments of the present disclosure.

As shown in FIGS. 7 and 8, in some embodiments, the flow disruptors 705, 805 can be moveable, but passive. In other words, as shown in FIG. 7, for example, the flow disruptor 705 can be pivotally coupled to the forward gate 405 (or aft gate 410) with, for example and not limitation, a hinge, pin, or pivot arm 710. In some embodiments, the flow disruptor 705 can further comprise a biasing element 715, or spring. In some embodiments, the biasing element 715 can comprise a rotary spring, as shown. In other embodiments, the biasing element 715 can comprise, for example and not limitation, a linear spring, a pneumatic spring, a piezoelectric actuator, or a shape memory alloy (SMA). In this manner, when the differential pressure through the gates 405, 410 is relatively low, the flow disruptor 705 can be in the deployed position to minimize tonal noise through the vent 450. When the differential pressure increases, on the other hand, the air pressure on the flow disruptor 705 can overcome the spring 715 pressure and automatically retract the flow disruptor 705.

Similarly, as shown in FIG. 8, in some embodiments, the flow disruptor 805 can be a flexible, inflatable structure. In this configuration, air at a predetermined pressure can be supplied to the cavity 460 of the gates 405, 410 or directly to the flow disruptor 805 to inflate it to the deployed position. When the differential pressure through the gates 405, 410 is relatively low, the air pressure inside the flow disruptor 805 enables the flow disruptor 805 to remain inflated/deployed. As the differential pressure through the system 400 increases, however, the air pressure above the flow disruptor 805 can increase to the point that the disruptor partially, and then fully deflates/retracts into the forward gate 405. In this manner, the flow disruptor 805 is available for noise control at lower differential pressures, but automatically retracts at higher differential pressures.

Figure 9:
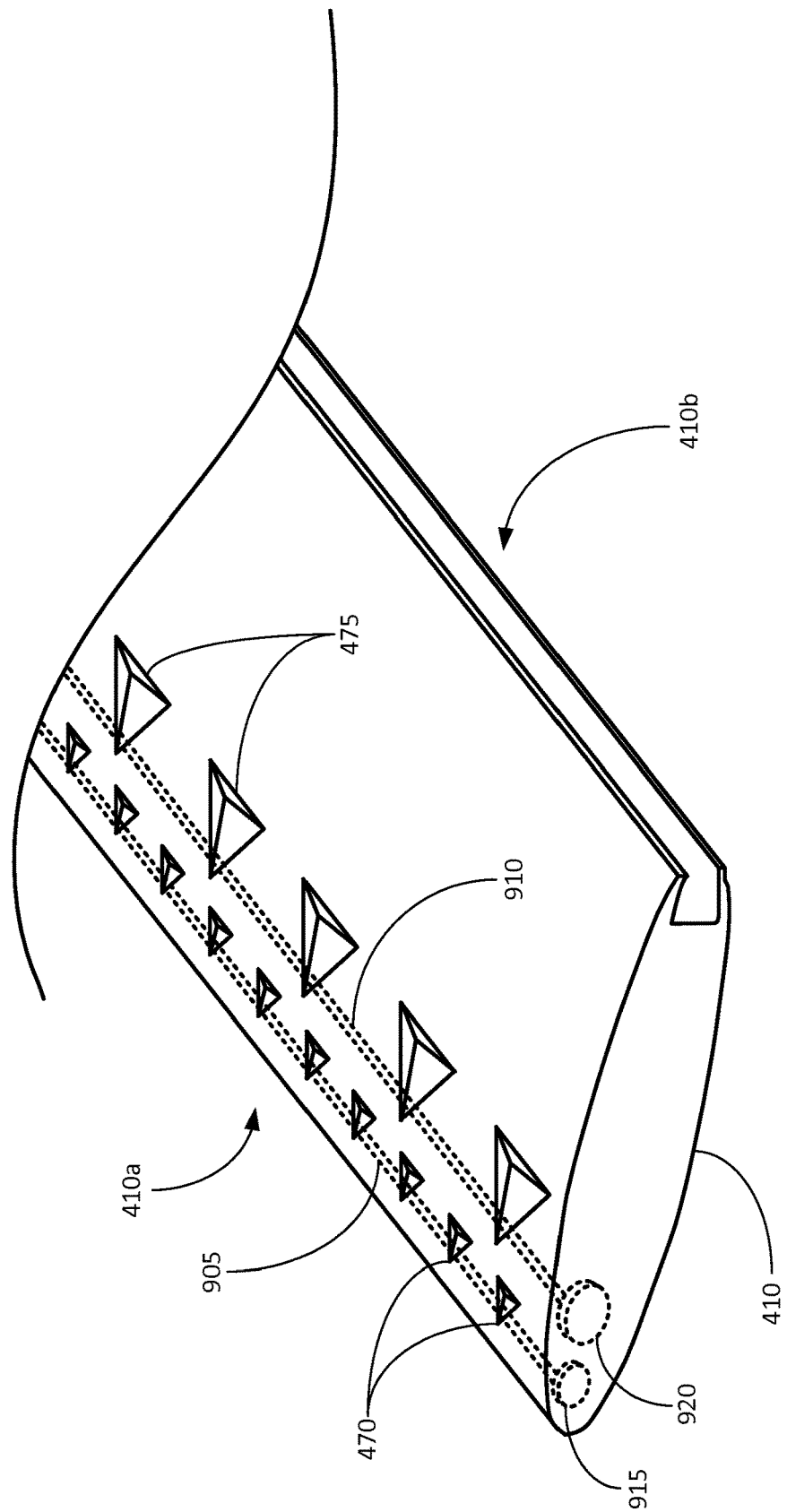
FIG. 9 depicts a flow disruptor actuator system, in accordance with some embodiments of the present disclosure.

As shown in FIG. 9, in still other embodiments, the system 400 can use various disruptor actuators to move the flow disruptors 470, 475 between the first, deployed position, and the second, retracted position. In some embodiments, the flow disruptors 470, 475 can be disposed on one or more shafts 905, 910. The shafts 905, 910 in turn can be connected to one or more servo motors 915, 920, transmission, or other power sources to move the flow disruptors 470, 475. In still other embodiments, each disruptor 470, 475 can include a direct disruptor actuator such as, for example and not limitation, a piezoelectric actuator, a linear servo, or solenoid mounted thereon. Of course, other passive retraction methods are possible and are contemplated herein.

While several possible embodiments are disclosed above, embodiments of the present disclosure are not so limited. For instance, while several possible passive and active actuators have been disclosed to move the flow disruptors 470, 475 between the first, deployed position, and the second, retracted position, other suitable configurations and actuators could be selected without departing from the spirit of the disclosure. In addition, the location and configuration used for various features of embodiments of the present disclosure such as, for example, the gates, actuators, flow disruptors, and sensors, can be varied according to a particular aircraft or application that requires a slight variation due to, for example, the size or construction of the aircraft, or weight or power constraints. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed embodiments, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A valve for regulating an interior pressure of a vehicle with reduced tonal and broadband noise, comprising:
    a first gate, positionable between a closed position and an open position, and comprising:
    a plurality of disruptors, located proximate a flow separation area of the first gate, at least one of the plurality of disruptors positionable between a retracted position that is not above a surface of the first gate and a deployed position wherein the at least one of the plurality of disruptors extends outward through the surface of the first gate and into a boundary layer formed on the surface of the first gate and are located on the surface of the first gate,
    wherein each of the at least one of the plurality of disruptors is pivotably coupled to the first gate by a pivot arm and is biased by a biasing element toward the deployed position; and
    wherein the at least one of the plurality of disruptors move from the deployed position to the retracted position when a differential pressure across the valve exerts a force on the at least one of the plurality of disruptors that is greater than a biasing force of the biasing element biasing the at least one of the plurality of disruptors toward the deployed position.

2. The valve of claim 1, wherein moving the first gate from the closed position to the open position causes an air flow from an interior portion of the vehicle to an exterior portion of the vehicle; and
    wherein the plurality of disruptors create turbulence in at least a first portion of the air flow energizing a boundary layer around the first gate.

3. The valve of claim 1, wherein the surface of the first gate is within a vent between the first gate and a second gate of the valve where air flows from an interior portion of the vehicle to and exterior portion of the vehicle when the first gate is in the open position, and wherein the plurality of disruptors on the surface of the first gate comprise:
    a plurality of small flow disruptors comprising a first height; and
    a plurality of large flow disruptors comprising a second height;
    wherein the first height is smaller than the second height.

4. The valve of claim 1, further comprising a first shaft detachably coupled to a first end of at least the first portion of the plurality of disruptors; and
    a motor detachable coupled to a first end of the first shaft to move at least the first portion of the plurality of disruptors between the retracted position and the deployed position.

5. The valve of claim 4, wherein all of the plurality of disruptors are positionable between the retracted position and the deployed position; and
    wherein all of the plurality of disruptors are detachably coupled to the first end of the first shaft.

6. A valve for regulating an interior pressure of a vehicle with reduced tonal and broadband noise, comprising:
    a first gate, positionable between a closed position and an open position, and comprising:
    a plurality of disruptors, located proximate a flow separation area of the first gate, at least one of the plurality of disruptors positionable between a retracted position that is not above a surface of the first gate and a deployed position wherein the at least one of the plurality of disruptors extends outward through the surface of the first gate and into a boundary layer formed on the surface of the first gate and are located on the surface of the first gate, wherein each of the at least one of the plurality of disruptors is a flexible, inflatable structure, wherein the first gate has a cavity filled with air at a predetermined pressure, wherein the at least one of the plurality of disruptors are inflated to the deployed position by the predetermined pressure when a differential pressure through the valve is less than the predetermined pressure in the cavity, and wherein the at least one of the plurality of disruptors are deflated to the retracted position by the differential pressure when the differential pressure through the valve is greater than the predetermined pressure in the cavity.

7. A valve for regulating an interior pressure of a vehicle with reduced tonal and broadband noise, comprising:

a first gate, positionable between a closed position and an open position, and comprising:

a plurality of disruptors, located proximate a flow separation area of the first gate, at least one of the plurality of disruptors positionable between a retracted position that is not above a surface of the first gate and a deployed position wherein the at least one of the plurality of disruptors extends outward through the surface of the first gate and into a boundary layer formed on the surface of the first gate and are located on the surface of the first gate, wherein the at least one of the plurality of disruptors are positionable between the retracted position and the deployed position; and wherein a remainder of the plurality of disruptors are fixed.

8. A system for regulating an interior pressure of a vehicle with reduced tonal and broadband noise comprising:

a valve comprising:

a first gate, positionable between a closed position and an open position, the first gate comprising a first plurality of disruptors positionable between a retracted position that is not above a surface of the first gate and a deployed position wherein the first plurality of disruptors extends outward through the surface of the first gate and into a boundary layer formed on the surface of the first gate and are located on the surface of the first gate; and a gate actuator coupled to the first gate and operable to move the first gate between the closed position and the open position; and a controller configured to transmit signals to the gate actuator for controlling the movement of the first gate, wherein one or more of the first plurality of disruptors are pivotally coupled to the first gate by pivot arms and biased by first biasing elements toward the deployed position; and wherein the one or more of the first plurality of disruptors move from the deployed position to the retracted position when the differential pressure across the valve exerts forces on the at least one of the first plurality of disruptors that is greater than biasing forces of the first biasing elements biasing the one or more of the first plurality of disruptors toward the deployed position.

9. The system of claim 8, further comprising one or more disruptor actuators coupled to the first plurality of disruptors and operable to move the first plurality of disruptors between the retracted position and the deployed position;

wherein the controller is configured to transmit signals to the one or more disruptor actuators for controlling movement of the first plurality of disruptors.

10. A system for regulating an interior pressure of a vehicle with reduced tonal and broadband noise comprising:

a valve comprising:

a first gate, positionable between a closed position and an open position, the first gate comprising a first plurality of disruptors positionable between a retracted position that is not above a surface of the first gate and a deployed position wherein the first plurality of disruptors extends outward through the surface of the first gate and into a boundary layer formed on the surface of the first gate and are located on the surface of the first gate; and a gate actuator coupled to the first gate and operable to move the first gate between the closed position and the open position; and a controller configured to transmit signals to the gate actuator for controlling the movement of the first gate, wherein one or more of the first plurality of disruptors are flexible, inflatable structures, where the first gate has a cavity filled with air at a predetermined pressure, wherein the one or more of the first plurality of disruptors are inflated to the deployed position by the predetermined pressure when a differential pressure through the valve is less than the predetermined pressure in the cavity, and wherein the one or more of the first plurality of disruptors are deflated from the deployed position to the retracted position by the differential pressure when the differential pressure across the valve is greater than the predetermined pressure in the cavity.

11. The system of claim 10, wherein the first gate is moveably coupled to a first portion of the vehicle such that moving the first gate from the closed position to the open position causes air to flow from an interior portion of the vehicle to an exterior portion of the vehicle; and wherein the first plurality of disruptors increase turbulence in a portion of the air flow around the first gate energizing a boundary layer of flow around the first gate.

12. The system of claim 10, further comprising a second gate comprising a second plurality of disruptors positionable between a retracted position and a deployed position;

wherein the first gate is an aft gate and the second gate is a forward gate;

wherein the first plurality of disruptors are disposed proximate a leading edge of the aft gate; and wherein the second plurality of disruptors are disposed proximate a trailing edge of the forward gate.

13. The system of claim 12, further comprising a first piezoelectric disruptor actuator disposed proximate a first disruptor of the first plurality of disruptors or the second plurality of disruptors;

wherein the controller is configured to transmit signals to the first piezoelectric disruptor actuator for controlling movement of the first disruptor.

14. The system of claim 10, wherein the surface of the first gate is within a vent between the first gate and a second gate of the valve where air flows from an interior portion of the vehicle to and exterior portion of the vehicle when the first gate is in the open position, and wherein the first plurality of disruptors on the surface of the first gate comprise:

a plurality of small flow disruptors; and a plurality of large flow disruptors, where the small flow disruptors are shorter than the large flow disruptors.

15. The system of claim 14, wherein the first portion of the first plurality of disruptors are disposed closer to a leading edge of the first gate than the second portion of the first plurality of disruptors.

16. A method of operating a valve with reduced tonal and broadband noise comprising:
    moving a first gate of a valve arranged in fluid communication with an interior and exterior of a vehicle between a closed position and an open position to allow air to flow out of the interior of the vehicle;
    wherein the first gate comprises a first plurality of flow disruptors positionable in a retracted position that is not above a first surface of the first gate and a deployed position wherein the first plurality of flow disruptors extends outward through the first surface of the first gate and into a first boundary layer formed on the first surface of the first gate and are located on the first surface of the first gate;
    wherein turbulence of a first portion of the air flow around the first gate is increased by the first plurality of flow disruptors energizing the first boundary layer of flow around the first gate; and
    wherein the first plurality of flow disruptors move from the deployed position to the retracted position to reduce broadband noise as pressure across the valve increases.

17. The method of claim 16, wherein the valve further comprises a second gate positionable between a closed position and an open position and comprising a second plurality of flow disruptors positionable between a retracted position that is not above a second surface of the second gate and a deployed position wherein the second plurality of flow disruptors extends outward through the second surface of the second gate and into a second boundary layer formed on the second surface of the second gate and are located on the second surface of the second gate, the method further comprising:
    moving the first gate, the second gate, or both between the closed position and the open position to allow air to flow therethrough;
    wherein the turbulence of a second portion of the air flow is increased by the second plurality of flow disruptors energizing the second boundary layer of flow around the second gate; and
    wherein the first plurality of flow disruptors and the second plurality of flow disruptors move from the deployed position to the retracted position to reduce broadband noise as air pressure across the valve increases.

* * * * *